United States Patent Office 2,749,350
Patented June 5, 1956

2,749,350

SELECTIVE OXIDATION OF NITROGEN-CONTAINING HETEROCYCLIC COMPOUNDS

Gene Nowlin, Bartlesville, Okla., assignor to Phillips Petroleum Company, a corporation of Delaware No Drawing. Application March 30, 1953,
Serial No. 345,694

7 Claims. (Cl. 260—295)

This invention relates to a novel process for the production of aliphatic substituted monocarboxylic acid derivatives of heterocyclic nitrogen-containing compounds by the selective oxidation of one of at least two aliphatic groups attached to a heterocyclic nitrogen-containing compound. In a more specific aspect, this invention relates to a selective oxidation to a carboxyl group of one of the aliphatic groups of polyaliphatic substituted heterocyclic nitrogen-containing compounds. In another specific aspect, it relates to the production of alkyl substituted monocarboxylic acids of heterocyclic nitrogen-containing compounds.

It is known to oxidize heterocyclic nitrogen-containing compounds to produce carboxylic acids such as pyridine carboxylic acids. One of the problems encountered in the production of heterocyclic monocarboxylic acids from polyaliphatic heterocyclic nitrogen-containing compounds is that of controlling the reaction so as to prevent oxidation of more than one aliphatic substituent.

Each of the following objects of the invention is attained by at least one of the aspects of the invention.

It is an object of this invention to provide a method for the selective oxidation of one of the aliphatic substituents in a substituted heterocyclic nitrogen-containing compound.

It is another object to provide a method for producing monocarboxylic acids from polyaliphatic substituted heterocyclic nitrogen-containing compounds.

It is another object to provide a novel catalytic process for the selective oxidation of only one aliphatic substituent in a polyaliphatic substituted heterocyclic nitrogen-containing compound. Other objects and advantages will be apparent to one skilled in the art upon reading this disclosure of the invention.

The monocarboxylic acids referred to in this disclosure include those wherein only one aliphatic constituent of a polyaliphatic substituted heterocyclic nitrogen-containing compound is oxidized to produce an acid.

I have now discovered a method for the selective oxidation of aliphatic substituents attached to a heterocyclic nitrogen-containing compound whereby only one of at least two aliphatic substituents is oxidized so as to produce aliphatic substituted monocarboxylic acids. I have discovered that by oxidizing these compounds in nitric acid at reflux temperature and in the presence of a selenium dioxide catalyst that a preferential oxidation occurs and the aliphatic substituent which will be preferentially oxidized can be readily determined. In accordance with my novel process, a compound as specified above, such as 2-methyl-5-ethylpyridine, is selectively oxidized to an alkyl substituted pyridine monocarboxylic acid by introducing a mixture of reactants including the said starting compound, nitric acid and selenium dioxide catalyst into a zone maintained at the reflux temperature of the mixture. These substances are reacted in said zone for a suitable time, followed by air blowing of the reaction mixture, so as to produce an alkyl substituted pyridine monocarboxylic acid, which in this case would be 6-methylnicotinic acid.

The present invention is applicable to the production of alkyl substituted monocarboxylic acids by selectively oxidizing one of the substituents of a heterocyclic nitrogen-containing compound of the pyridine or quinoline series having at least two alkyl groups attached to the N-containing nucleus. Typical compounds of the type described include 2-methyl-5-ethylpyridine, 2-methyl-4-ethylpyridine, 3-ethyl-4-methylpyridine, 2,4-dimethylpyridine, 3,4-dimethylpyridine, 2-ethyl-3,5-dimethylpyridine, 2,3-dimethylquinoline, 2,4-dimethylquinoline, 2,3,4-trimethylquinoline and the like.

The monocarboxylic acid obtained according to the practice of my invention will be determined by the nature of the starting material. The determination of the product of the following discussion wherein position A in the pyridine nucleus corresponds to position 2, 4, and 6 and position B corresponds to position 3 or 5 will be as hereinafter set forth.

When all alkyl groups attached to the pyridine nucleus are equivalent, i. e., contain the same number of carbon atoms and same skeletal structure, then those attached at position A will be oxidized in preference to those attached at position B. For example, all alkyl groups can be either:

(1) Methyl groups
(2) Primary-alkyls, such as ethyl, n-propyl, iso-butyl, etc.
(3) Secondary-alkyls having a secondary carbon attached to the nucleus such as, $$-\underset{\underset{C}{|}}{C}-C, \quad -\underset{\underset{C}{|}}{C}-C-C, \quad -\underset{\underset{\underset{C}{|}}{\underset{C}{|}}}{C}-C-C,$$

etc., or (4) Tertiary-alkyls wherein a tertiary carbon atom is attached to the pyridine nucleus such as $$-\underset{\underset{C}{|}}{\overset{\overset{C}{|}}{C}}-C$$

but all substituents must be alike.

When alkyl groups are non-equivalent, i. e., contain either a different number of carbon atoms or a different skeletal structure, but are all attached in equivalent positions [i. e., substituents are either all in the A position (2, 4, 6) or all in the B position (3 or 5)], then the nature of the carbon atom directly attached to the pyridine nucleus determines the oxidizability of the alkyl group. In order of decreasing order of oxidation preference, these carbon atoms are quaternary>tertiary>secondary>primary, e. g., tertiary-butyl>isopropyl>n-propyl or ethyl>methyl.

When alkyl groups are non-equivalent, i. e., contain either a different number of carbon atoms or a different skeletal structure and are attached at non-equivalent positions, e. g., in both positions A and B, the relative rate of oxidation of the alkyl groups will be determined primarily by their skeletal structure and to a lesser degree by their position (A or B).

The order of decreasing preference of oxidation of alkyl groups is:

(t-butyl)      (isopropyl)      (ethyl)      (methyl group)
quaternary C atom > tertiary C atom > secondary C atom > primary C atom independent of position on the pyridine ring.

Examples of the above are as follows:

(1) Ethyl n-propyl, n-butyl, etc., at B (or A) oxidize in preference to methyl at A (or B).
(2) Isopropyl, sec-butyl, sec-amyl, etc., at B (or A) more readily than ethyl, n-propyl, n-butyl, etc., or methyl at A (or B).

(3) Tert-butyl, etc., at B (or A) more readily than methyl, isopropyl, etc., at A (or B).

(4) However, in the case of different groups of a homologous series such as, ethyl and n-butyl when these groups are attached at non-equivalent positions, i. e., at both A and B, those groups attached at position A will be preferentially oxidized.

Alkynyl groups will be oxidized in preference to alkenyl (and alkyl groups) and alkenyl groups in preference to alkyls. The order of decreasing preference of oxidation with respect to degree of unsaturation is: alkynyl>alkenyl>alkyl independent of position on the pyridine ring.

Alkenyl heterocyclic nitrogen-containing compounds which can be oxidized according to the practice of this invention include 2-vinyl-5-ethylpyridine, 2-methyl-5-vinylpyridine, 2-methyl-4-vinylpyridine, 2-vinyl-5-butylpyridine, and 2-vinyl-3-pentyl-5-heptylpyridine.

Alkynyl heterocyclic nitrogen-containing compounds which can be oxidized according to the practice include 4 - ethynyl - 3 - methylpyridine, 2 - methyl - 5 - ethynylpyridine, and 2-pentynyl-3,5-dimethylpyridine.

Representative heterocyclic nitrogen-containing compounds and corresponding products of selective oxidation are tabulated as follows:

Table I

| Compound | Oxidized Product |
| --- | --- |
| 2-methyl-5-ethylpyridine | 6-methylnicotinic acid. |
| 2-methyl-4-ethylpyridine | 2-methyl-isonicotinic acid. |
| 3-ethyl-4-methylpyridine | 4-methylnicotinic acid. |
| 3,4-dimethylpyridine | 3-methyl-isonicotinic acid. |
| 2-ethyl-3,5-dimethylpyridine | 3,5-dimethylpicolinic acid. |
| 2-vinyl-5-ethylpyridine | 5-ethylpicolinic acid. |
| 4-ethynyl-3-methylpyridine | 3-methyl-isonicotinic acid. |

The nitric acid employed in my process will have an initial strength between 40 and 95 weight per cent $HNO_3$, and preferably will be between 55 and 65 weight per cent $HNO_3$. An excess of acid will always be used and from 5 to 20, preferably from about 7 to 15 parts by weight of acid as $HNO_3$ will be employed for each part by weight of dialkyl substituted heterocyclic nitrogen-containing starting material.

The amount of selenium dioxide catalyst employed may vary widely but generally an amount of catalyst between about 0.5 to 15 weight per cent of the dialkyl substituted heterocyclic nitrogen-containing starting material will be employed.

Reaction temperatures for the present process will be in the range from 70 to 200° C., preferably from 100 to 150° C. Pressures applicable for use in the present process include atmospheric and higher. When employing reaction temperatures at or above the reflux temperature of nitric acid suitable reflux means or adequate pressure to prevent loss by evaporation will be required. The reaction period of the present process will be in the range from 5 to 150 hours.

The aliphatic substituted pyridine monocarboxylic acids formed in accordance with the procedure of my process will be recovered in any suitable manner. Thus all or a portion the nitric acid can be removed by distillation. The reaction mixture is then cooled to room temperature and neutralized with an alkaline material such as sodium hydroxide. The carboxylic acid can then be recovered by precipitation as the copper salt by reaction with copper acetate or copper sulfate and recovering the precipitate by filtration. The carboxylic acid can then be recovered by suspending the copper salt in water, e. g., one mol of salt per liter of water, and heating the suspension to near the boiling point and introducing hydrogen sulfide while stirring the suspension, so as to convert the copper to copper sulfide. Separation of copper sulfide is then effected by filtration leaving the monocarboxylic acid in solution in the filtrate. The acid is then recovered by evaporation of the filtrate. The monocarboxylic acid may also be recovered by converting the copper salt into the sodium salt by reaction with sodium hydroxide. The carboxylic acid is then recovered by acidifying the sodium salt solution and cooling so as to crystallize the acid.

The air treating step of my process can be conducted by blowing the reaction mixture for a period of from 0.5 to 5 hours at an air flow rate of 1–10 volumes of air (STP) per volume of reaction mixture per minute or by treating the reaction mixture with an equivalent amount of oxygen. This air treating step can either be conducted during the addition of the starting material to the reaction mixture or subsequent to said addition. In some instances it may be desirable to operate the present process without said air treating step and such operation is to be included within the scope of the present invention.

The following example will serve to illustrate the advantages of my invention and should not be construed to limit the invention unduly.

*Example I*

A run was made wherein 0.5 mol (60.5 grams) of 2-methyl-5-ethylpyridine was dissolved in 1000 ml. of concentrated nitric acid (60 weight per cent). Eight grams (0.072 mol.) of selenium dioxide was admixed with this solution and the mixture was then heated at 115–120° C. with stirring for 120 hours. Air was then bubbled through the reaction mixture at a rate of approximately 1 volume of air per volume of reaction mixture per minute for a period of 1 hour. The reaction mixture was then cooled and neutralized (pH 6.4) with 30 per cent aqueous sodium hydroxide. A saturated solution of cupric acetate was then added until precipitation ceased. The precipitate was recovered by filtration and was washed with water and then with acetone to remove inorganic salts and unreacted 2-methyl-5-ethylpyridine. It was finally washed with acetone and then with ether and dried.

Thus 113.9 grams of the copper salt of 6-methylnicotinic acid was recovered. This copper salt was very brilliant green (emerald green) in color. This represented a yield of 68 weight per cent of 6-methylnicotinic acid based on 2-methyl-5-ethylpyridine charged. 6-methylnicotinic acid was recovered from a portion of the copper salt for identification purposes as follows: 10 grams of the copper methylnicotinate was suspended in 20 ml. of water and boiled and sufficient 30 per cent aqueous sodium hydroxide was added to precipitate all copper as cupric oxide. The hot solution was filtered to remove copper oxide. The filtrate was brought to the isoelectric point by addition of dilute aqueous sulfuric acid (pH of ~3.5). The volume of the filtrate was reduced to 20 ml. by evaporation and methanol was added to precipitate the major portion of the sodium sulfate and said sodium sulfate was removed by filtration. The filtrate was evaporated to dryness and the residue, and the previously recovered sodium sulfate were digested with normal butanol and filtered to remove sodium sulfate. Concentration of the filtrate, followed by cooling, produced 2.8 grams of white crystalline 6-methylnicotinic acid having a melting point of 208 to 210° C.

Variations and modifications are possible within the scope of the disclosure of the present invention, the essence of which is that an improved catalytic process for the selective oxidation of one of the aliphatic groups of polyaliphatic substituted heterocyclic nitrogen-containing compounds has been discovered which comprises reacting the compound with nitric acid and in the presence of a catalyst comprising selenium dioxide at elevated temperature for a time sufficient to produce the desired selective oxidation reaction.

I claim:

1. A process for producing aliphatic hydrocarbon substituted heterocyclic monocarboxylic acids from aliphatic hydrocarbon substituted pyridines having a plurality of aliphatic hydrocarbon substituents, none of which contain more than 10 carbon atoms, which consists essentially of reacting said pyridine with an excess of nitric acid containing between 55 and 65 weight per cent $HNO_3$ at reflux temperature in the range 70 to 200° C. and in the presence of between 0.5 to 15 weight per cent of the pyridine of selenium dioxide as the sole reactants for a period of 5 to 150 hours.

2. The process of claim 1 wherein 6-methylnicotinic acid is produced from 2-methyl-5-ethylpyridine.

3. The process of claim 1 wherein 2-methyl-isonicotinic acid is produced from 2-methyl-4-ethylpyridine.

4. The process of claim 1 wherein 4-methylnicotinic acid is produced from 3-ethyl-4-methylpyridine.

5. The process of claim 1 wherein 3,5-dimethylpicolinic acid is produced from 2-ethyl-3,5-dimethylpyridine.

6. The process of claim 1 wherein 5-ethylpicolinic acid is produced from 2-vinyl-5-ethylpyridine.

7. The process of producing 6-methylnicotinic acid which comprises reacting reactants consisting of one part by weight of 2-methyl-5-ethylpyridine with from 5 to 20 parts by weight of 40 to 95 weight per cent $HNO_3$ in the presence of between about 0.5 to 15 parts by weight of a catalyst comprising selenium dioxide at reflux temperature of the mixture at atmospheric pressure for a period of time in the range from 5 to 150 hours; and recovering 6-methylnicotinic acid.

References Cited in the file of this patent
UNITED STATES PATENTS

| | | |
|---|---|---|
| 2,436,660 | Mueller | Feb. 24, 1948 |
| 2,449,906 | Mueller | Sept. 21, 1948 |
| 2,487,874 | Huber | Nov. 15, 1949 |
| 2,524,957 | Burrows et al. | Oct. 10, 1950 |